(12) United States Patent
Malakoff et al.

(10) Patent No.: US 8,765,874 B2
(45) Date of Patent: Jul. 1, 2014

(54) ETHYLENE BASED POLYMERS AND ARTICLES MADE THEREFROM

(75) Inventors: Alan M. Malakoff, Houston, TX (US);
Danny Van Hoyweghen, Heverlee (BE);
Hitesh A. Fruitwala, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 643 days.

(21) Appl. No.: 12/020,944

(22) Filed: Jan. 28, 2008

(65) Prior Publication Data
US 2009/0192270 A1    Jul. 30, 2009

(51) Int. Cl.
*C08L 23/00* (2006.01)
*C08L 23/04* (2006.01)

(52) U.S. Cl.
USPC ........ 525/240; 525/191; 526/352; 526/352.2; 428/500

(58) Field of Classification Search
USPC .................................. 525/240, 191; 526/352
See application file for complete search history.

(56) References Cited

U.S. PATENT DOCUMENTS

| | | | |
|---|---|---|---|
| 5,008,204 A | 4/1991 | Stehling | |
| 5,569,693 A | 10/1996 | Doshi et al. | |
| 6,242,545 B1 | 6/2001 | Jejelowo et al. | |
| 6,248,845 B1 | 6/2001 | Loveday et al. | |
| 6,528,597 B2 * | 3/2003 | Loveday et al. | 526/113 |
| 6,800,692 B2 * | 10/2004 | Farley et al. | 525/191 |
| 6,932,592 B2 * | 8/2005 | Farley et al. | 425/523 |
| 6,933,346 B2 * | 8/2005 | Yasaka et al. | 525/191 |
| 6,936,675 B2 * | 8/2005 | Szul et al. | 526/348.2 |
| 6,956,088 B2 | 10/2005 | Farley et al. | |
| 7,125,933 B2 * | 10/2006 | German et al. | 525/191 |
| 7,132,486 B2 * | 11/2006 | Dekmezian et al. | 526/119 |

FOREIGN PATENT DOCUMENTS

| | | | |
|---|---|---|---|
| KR | 10623172 | * | 9/2006 |
| WO | WO 93/03093 | | 2/1993 |

OTHER PUBLICATIONS

L. Wild et al., Determination of Branching Distributions in Polyethylene and Ethylene Copolymers, Journal of Polymer Science: Polymer Physics Edition, vol. 20, pp. 441-455, 1982.
T. Sun et al., Effect of Short Chain Branching on the Coil Dimensions of Polyolefins in Dilute Solution, Macromolecules, vol. 34, pp. 6812-6820, 2001.

* cited by examiner

*Primary Examiner* — Irina Krylova
(74) *Attorney, Agent, or Firm* — Frank E. Reid; Jamie L. Sullivan; Leandro Arechederra, III

(57) ABSTRACT

Provided are ethylene-based polymer compositions, articles made therefrom, and methods of making the same. Ethylene-based polymer compositions include blends of a linear low density polyethylene prepared with metallocene catalyst and a low density polyethylene. The linear low density polyethylene may optionally have about five mole percent or less of monomer units derived from an alpha-olefin comonomer. Articles composed of such ethylene-based polymer compositions, such as blown films, exhibit favorable physical properties, including excellent optical properties and retained strength i.e., mitigation of expected decline in physical strength due to LDPE addition.

23 Claims, 3 Drawing Sheets

Heat Seal Curves

Hot Tack Strength

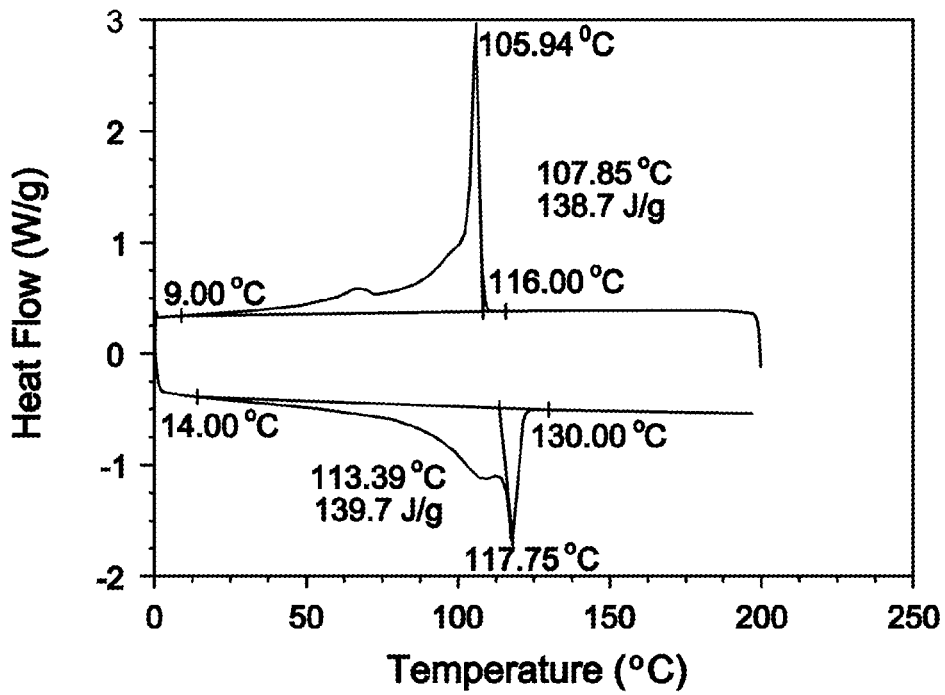
Fig. 3(a) Film 1
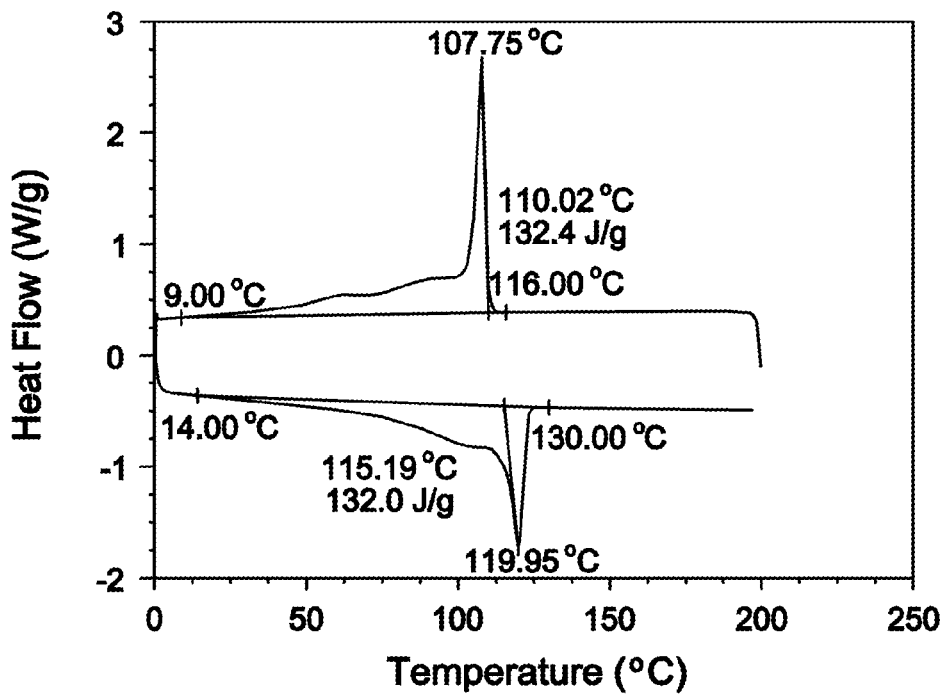
Fig. 3(b) Film 2

Film 3

Film 4

ETHYLENE BASED POLYMERS AND ARTICLES MADE THEREFROM

FIELD OF THE INVENTION

The present invention is directed to ethylene-based polymers, articles made therefrom, and methods for making the same. In particular, provided are films prepared from linear low density polyethylene polymers and low density polyethylene, and methods of preparing the films.

BACKGROUND OF THE INVENTION

Ethylene-based polymers are generally known in the art. For example, polymers and blends of polymers have typically been made from a linear low density polyethylene prepared using Ziegler-Natta and/or metallocene catalyst in a gas phase process.

Films made from linear low density polyethylene (LLDPE) are known to have favorable physical properties such as stiffness, Elmendorf tear strength, and/or impact strength. However, conventional LLDPE often exhibits unfavorable processibility and clarity characteristics compared to conventional high pressure, low density polyethylene (LDPE).

LLDPE is often blended with low density polyethylene to improve processability or clarity. However, addition of low density polyethylene is known to decrease physical strength attributes, such as dart drop properties and MD tear properties. Therefore, it is frequently difficult to achieve a balance of favorable properties.

Accordingly, the film industry is still in search of methods and compositions that overcome these shortcomings and provide improved physical properties, improved processability, and improved balance of properties.

SUMMARY OF THE INVENTION

Provided are ethylene-based polymer compositions, articles made therefrom, and methods of making the same. Ethylene-based polymer compositions composed of a major amount of LLDPE prepared with metallocene catalyst and a minor amount of LDPE unexpectedly maintained favorable physical attributes while mitigating loss of strength commonly exhibited by conventional blends. The linear low density polyethylene may optionally include about 5 mole percent or less of monomer units derived from an alpha-olefin comonomer.

In one embodiment, LLDPE is prepared by polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 mol % to about 99 mol % of the hafnium compound. Preferably, the LLDPE polymer has up to about 5 mol % units derived from an alpha-olefin, a melt index of from about 0.1 g/10 min to about 300 g/10 min, a melt index ratio of from about 15 to about 45, a weight average molecular weight ($M_w$) of from about 15,000 to about 250,000, a molecular weight distribution ($M_w/M_n$) of from about 2.0 to about 4.5, and a $M_z/M_w$ ratio of from about 1.5 to about 3.5, and a density of from about 0.900 g/cm³ to about 0.955 g/cm³.

Articles composed of such ethylene-based polymer compositions, such as blown or cast films, exhibit favorable physical properties, including improved dart drop and MD tear properties, sealing capability/range, bubble stability, and clarity. For example, films prepared from the present ethylene-based polymer compositions maintained up to twice as much physical strength measured by tensile strength, Elmendorf tear, puncture resistance, and dart drop analysis compared to conventional blends. Typical articles prepared from ethylene-based polymer compositions include monolayer and multilayer films, which may be produced by either a blown or cast process, and articles made from such films.

DESCRIPTION OF THE FIGURES

FIGS. 3(a)-3(d) are a series of differentiating scanning calorimeter graphs that illustrate crystallization and melting behavior of films produced from the present ethylene-based polymer compositions and a conventional zirconium based metallocene polymer.

DETAILED DESCRIPTION OF THE INVENTION

Figure 1:
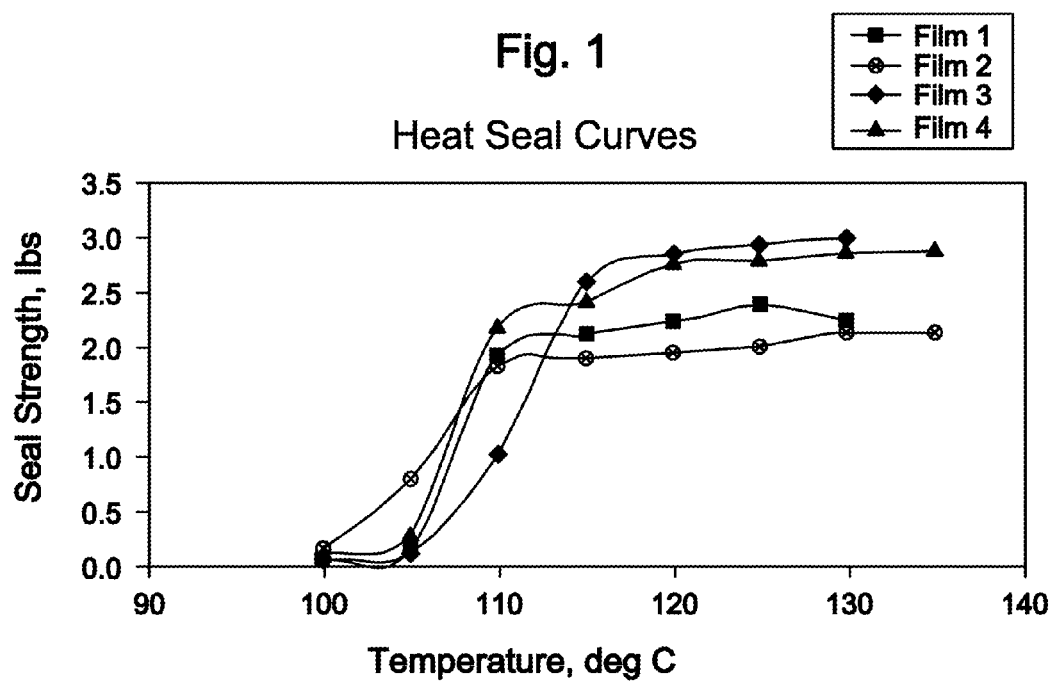
FIG. 1 is a graph of heat sealing curves comparing blown films produced from the present ethylene-based polymer compositions and a conventional zirconium-based metallocene polymer.

Provided are ethylene-based polymer compositions, articles made therefrom, and methods of making the same. Ethylene-based polymer compositions composed of a major amount of LLDPE prepared with metallocene catalyst and a minor amount of LDPE unexpectedly maintained favorable physical attributes while reducing unfavorable strength attributes commonly found in conventional blends. Articles composed of such ethylene-based polymer compositions, such as blown or cast films, exhibit favorable physical properties, including improved dart drop and MD tear properties, sealing capability/range, bubble stability, and clarity. For example, films prepared from the present ethylene-based polymer compositions maintained up to twice as much physical strength measured by tensile strength, Elmendorf tear, puncture resistance, and dart drop analysis compared to conventional blends.

Ethylene-based polymer compositions include as a major portion a LLDPE prepared from metallocene catalyst and as a minor portion a LDPE. As used herein, "LLDPE" and "linear low density polyethylene" mean substantially linear polyethylene homopolymers or copolymers having a significant number of short branches. As used herein "copolymer" means polymers having more than one type of monomer, including interpolymers, terpolymers, or higher order polymers. "Metallocene catalyzed linear low density polyethylene" and "mLLDPE" mean a LLDPE produced with a metallocene catalyst.

Ethylene-based polymer compositions optionally include other ethylene derived polymers that are blended with LLDPE and LDPE. Ethylene-based polymer compositions are optionally blended with other polymers, e.g. propylene-based polymers, to form blended compositions and articles.

Conventional ethylene-based polymer compositions are described in U.S. Pat. Nos. 6,956,088, 6,936,675, 6,528,597, 6,248,845, and 6,242,545, each of which is herein incorporated by reference in its entirety. Ethylene based polymer compositions are also described in U.S. Provisional Application No. 60/809,509; U.S. application Ser. No. 11/789,391; and U.S. Pat. Nos. 7,172,816, and 7,179,876, each of which is herein incorporated by reference in its entirety.

The present LLDPEs are distinguished structurally from conventional low-density polyethylene due to a low or zero incidence of long chain branching. Preferably, LLDPEs have minimal long chain branching.

LLDPE copolymers include alpha-olefin comonomers selected from those having 3 to 20 carbon atoms, such as $C_3$-$C_{20}$ alpha-olefins or $C_3$-$C_{12}$ alpha-olefins. Alpha-olefin comonomers are linear or branched or may include two unsaturated carbon-carbon bonds, i.e., dienes. Examples of suitable comonomers include linear $C_3$-$C_{12}$ alpha-olefins and alpha-olefins having one or more $C_1$-$C_3$ alkyl branches or an aryl group. Comonomer examples include propylene, 1-butene, 3-methyl-1-butene, 3,3-dimethyl-1-butene, 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, ethyl, methyl, or dimethyl-substituted 1-decene, 1-dodecene, and styrene. Exemplary combinations of ethylene and comonomers include: ethylene 1-butene, ethylene 1-pentene, ethylene 4-methyl-1-pentene, ethylene 1-hexene, ethylene 1-octene, ethylene decene, ethylene dodecene, ethylene 1-butene 1-hexene, ethylene 1-butene 1-pentene, ethylene 1-butene 4-methyl-1-pentene, ethylene 1-butene 1-octene, ethylene 1-hexene 1-pentene, ethylene 1-hexene 4-methyl-1-pentene, ethylene 1-hexene 1-octene, ethylene 1-hexene decene, ethylene 1-hexene dodecene, ethylene propylene 1-octene, ethylene 1-octene 1-butene, ethylene 1-octene 1-pentene, ethylene 1-octene 4-methyl-1-pentene, ethylene 1-octene 1-hexene, ethylene 1-octene decene, ethylene 1-octene dodecene, and combinations thereof. It should be appreciated that the foregoing list of comonomers and comonomer combinations are merely exemplary and are not intended to be limiting. Preferably, the comonomer is 1-butene, 1-hexene, or 1-octene. Most preferably, the comonomer is 1-hexene.

If a comonomer is used, the monomer is generally polymerized in a proportion of from 50.0 to 99.9 wt % of monomer, preferably, from 70 to 99 wt % of monomer, and more preferably, from 85 to 95 wt % of monomer, with from 0.1 to 50 wt % of comonomer, and more preferably, from 5 to 15 wt % of comonomer. For linear polyethylenes, the amount of comonomers, comonomer distribution along the polymer backbone, and comonomer branch length will generally delineate the density range.

In one or more embodiments, LLDPE has a copolymer content, as a bulk measurement, of from about 0.1 to about 5.0 mol % comonomer. In other embodiments the comonomer content is from about 0.1 to about 4.0, or from about 0.1 to about 3.0, or from about 0.1 to about 2.0, or from about 0.5 to about 5.0, or from about 1.0 to about 5.0.

In one or more embodiments, the present LLDPEs have a density from about 860 to about 970 or from about 900 g/cm³ to about 960 g/cm³. Preferably, LLDPEs have a density in the range of from about 0.900 g/cm³ to about 0.955 g/cm³, or from about 900 g/cm³ to about 0.945 g/cm³, or more preferably in the range of from about 0.905 g/cm³ to about 0.940 g/cm³, or from about 0.910 g/cm³ to about 0.935 g/cm³, and even more preferably in the range from about 0.915 g/cm³ to 0.925 g/cm³. Density is measured in accordance with ASTM D-1505. "Density" as used herein, and unless otherwise specified, refers to the density of the polymer independent of any additives, such as antiblocks, which may change the tested value.

In some embodiments, LLDPEs have a melt index, $I_{2.16}$, of from about 0.1 g/10 min to about 30 g/10 min. Preferably, the LLDPE has a melt index, $I_{2.16}$, of from about 0.3 g/10 min to about 5.0 g/10 min, or from about 0.5 g/10 min to about 1.5 g/10 min, or from about 0.75 g/10 min to about 1.2 g/10 min. In one embodiment, the LLDPE has a melt index, $I_{2.16}$, of about 1 $I_{2.16}$ is measured by ASTM D-1238-E (190/2.16).

In some embodiments, LLDPE has a melt index ratio ($I_{21.6}/I_{2.16}$) of from about 15 to about 40 or from about 18 to about 35, or from about 20 to about 25. In one embodiment, the mLLDPE has a melt index ratio of about 24. The $I_{21.6}$ melt index is measured by ASTM D-1238-F (190/21.6).

Melting and crystallization temperatures may also be used to characterize ethylene-based polymer compositions. Thermal analysis is performed by placing a sample in either resin, plaque or film form, in a differential scanning calorimeter (DSC), e.g., Perkin Elmer 7 Series Thermal Analysis System. The sample is heated to a final temperature and thermal output, $\Delta H_f$, is recorded as the area under the melting peak curve of the sample. The thermal output in joules is a measure of the heat of fusion. The melting temperature, $T_{m1}$, is recorded as the temperature of the greatest heat absorption within the range of melting of the sample. This is called the first melt. The sample is then cooled. $T_c$ is the crystallization temperature, which is recorded as the temperature of greatest heat generation. The sample is reheating to form a second melt, which is more reproducible than the first melt and more representative of the intrinsic polymer. The peak melting temperature from the second melt is recorded as the second melting temperature, $T_{m2}$.

Preferably, the present LLDPE exhibits a second melt temperature of from about 100° C. to about 130° C., or about 110° C. to about 130° C., or from about 115° C. to about 125° C., or from about 119° C. to about 123° C. Preferably, LLDPE exhibits a crystallization temperature, $T_c$, of from about 95° C. to about 120° C., or from about 100° C. to about 115° C., or from about 106° C. to about 110° C.

Composition distribution is measured by Composition Distribution Breadth Index (CDBI) or solubility distribution breadth index (SDBI). Further details of determining the CDBI or SDBI of a copolymer are known to those skilled in the art. See, for example, PCT Patent Application WO 93/03093, published Feb. 18, 1993, which is herein incorporated by reference in its entirety.

CDBI is the weight percent of a copolymer having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., J. Poly. Sci., Poly. Phys. Ed., Vol. 20, pg. 441 (1982) and U.S. Pat. No. 5,008,204, which are each fully incorporated herein by reference. As used herein SDBI measures the breadth of the solubility distribution curve for a given polymer.

Both CDBI and SDBI are determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 ml of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 μm, 2853 cm$^{-1}$ sym. stretch) and to compensate for base line drifts (3.6 μm) during the analysis time. The solution concentration is monitored at certain temperature intervals, yielding a cumulative concentration curve.

The derivative of this curve with respect to temperature represents the weight fraction of crystallized polymer at each temperature. In both standard and cryo procedures, any resin in solution below the temperature to which the solution is cooled is defined as "% solubles." The cryo procedure outlined above, i.e., cooling to 0° C., typically provides greater detail, especially for amorphous samples that tend to stay in solution at or around 30° C.

In one or more embodiments, LLDPEs have a CDBI less than about 50%, preferably less than about 40%, and more preferably less than about 35%. In one embodiment, LLDPE also has a CDBI of greater than about 20.

In one or more embodiments, LLDPE have an SDBI greater than about 15° C., or greater than about 16° C., or greater than about 17° C. In one embodiment, the mLLDPE has an SDBI of from about 18° C. to about 20° C.

As used herein, weight average molecular weight is $$M_w = \frac{\sum_i n_i M_i^2}{\sum_i n_i M_i}$$

Number average molecular weight is $$M_n = \frac{\sum_i n_i M_i}{\sum_i n_i}$$

The z-average molecular weight is $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001), which is incorporated herein by reference.

In some embodiments, LLDPEs typically have a weight average molecular weight ($M_w$) of from about 15,000 to about 250,000. Preferably, the weight average molecular weight is from about 50,000 to about 200,000, or from about 90,000 to about 130,000.

Molecular weight distribution ("MWD") is equivalent to the expression $M_w/M_n$. The expression $M_w/M_n$ is the ratio of the weight average molecular weight ($M_w$) to the number average molecular weight ($M_n$). The present LLDPEs have a molecular weight distribution ($M_w/M_n$) of from about 1.5 to about 5, particularly from about 2.5 to about 4.5, preferably from about 3.0 to about 4.0, or more preferably about 3.0 to about 3.5.

LLDPE has a ratio of z-average molecular weight to weight average molecular weight of from about 1.5 to about 3.5. In yet another embodiment, this ratio is from about 1.8 to about 2.5 or from about 2.0 to about 2.4.

LLDPE is prepared with conventional catalysts and/or catalysts systems known to those skilled in the art. Exemplary catalyst systems are found in U.S. Pat. Nos. 6,242,545, 6,248, 845, 6,956,088, 7,172,816 and 7,179,876, each of which is herein incorporated by reference in its entirety.

Preferably, LLDPEs are prepared with a catalyst system that includes a hafnium transition metal metallocene-type catalyst for polymerizing one or more olefins. The metallocene catalyst is represented by the formula:

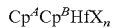

wherein each X is chemically bonded to Hf, each Cp group is chemically bonded to Hf, and n is 0 or an integer from 1 to 4. Preferably, n is 1 or 2. The ligands represented by $Cp^A$ and $Cp^B$ may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ may be unsubstituted or substituted with any one or combination of substituent groups R. Non-limiting examples of substituent groups R include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Exemplary hafnocene catalyst systems used to produce LLDPEs are set forth in the description and examples of U.S. Pat. Nos. 6,936,675 and 6,528,597, both of which are fully incorporated herein by reference. The hafnocene catalyst systems used herein produce polymers having higher molecular weights in comparison to zirconocene equivalents at the same or similar polymerization conditions. Additionally, the substituted hafnocenes described herein tend to produce lower density polymer products than zirconocene equivalents at substantially the same molecular weight.

LLDPEs are polymerized in any catalytic polymerization process, including solution phase processes, gas phase processes, slurry phase processes, and combinations of such processes known to those skilled in the art. Preferably, a gas or slurry phase process is used. An exemplary process used to polymerize ethylene-based polymers, such as LLDPEs, is as described in U.S. Pat. Nos. 6,936,675 and 6,528,597, which are each incorporated herein by reference.

Persons having skill in the art will recognize that the above-described processes may be tailored to achieve desired LLDPE resins. For example, comonomer to ethylene concentration or flow rate ratios are commonly used to control resin density. Similarly, hydrogen to ethylene concentrations or flow rate ratios are commonly used to control resin molecular weight.

Additionally, the use of a process continuity aid, while not required, may be desirable in any of the foregoing processes. Such continuity aids are well known to persons of skill in the art and include, for example, metal stearates.

During copolymerization, monomer feeds are regulated to provide a ratio of ethylene to comonomer, e.g., alpha-olefin. The reaction temperature, monomer residence time, catalyst system component quantities, and molecular weight control agent (such as $H_2$) may be regulated so as to provide a desired LLDPE resins.

LLDPE produced by the processes described herein, particularly in slurry or gas phase process, contain less than 5 ppm hafnium, generally less than 2 ppm hafnium, preferably less than 1.5 ppm hafnium, more preferably less than 1 ppm hafnium. In an embodiment, LLDPE contains in the range of from about 0.01 ppm to about 2 ppm hafnium, preferably in the range of from about 0.01 ppm to about 1.5 ppm hafnium, more preferably in the range of from about 0.01 ppm to 1 or less ppm hafnium.

LDPE utilized in ethylene-based polymer compositions are generally known to those skilled in the art. Various conventional LDPEs have been commercially manufactured since the 1930s. Preferably, LDPE is prepared by high pressure polymerization using free radical initiators, and typically has a density in the range of 0.915-0.935 g/cm$^3$. LDPEs may have melt indices ($I_{2.16}$) in the range of from 0.2 g/10 min to in excess of 100 g/10 min. Resins in the melt index range of from about 0.2 g/10 min to about 30 g/min are typically used as blend components with LLDPE in film production. LDPE is also known as "branched" or "heterogeneously branched" polyethylene because of the relatively large number of long chain branches extending from the main polymer backbone.

In a preferred embodiment, the LDPE used as a blend component with LLDPE for film production exhibits:

a melt index ($I_{2.16}$) of from about 0.2 g/10 min to about 10 g/10 min, preferably from about 0.7 g/10 min to about 6.5 g/10 min or most preferably from about 1 g/10 min to about 3 g/10 min, and a density of from about 0.915 g/cm$^3$ to about 0.935 g/cm$^3$, preferably from about 0.919 g/cm$^3$ to about 0.925 g/cm$^3$.

Although, melt index ratio ($I_{21.6}/I_{2.16}$) is typically not measured or monitored on LDPE, the LDPE used as blend components preferably have a melt index ratio in excess of 40.

Preferably, LDPE used as a blend component with LLDPE for film production is produced by either conventional tubular or autoclave high pressure processes.

The LDPE used as a blend component with LLDPE for film production is typically a homopolymer, but may instead be a copolymer containing vinyl acetate or methyl acrylate or other polymer monomer. The LDPE used as a blend component with LLDPE for film production may itself be a blend of two or more different LDPE resins.

In one or more embodiments, ethylene-based polymer compositions include blends of LLDPE and LDPE, and minor components of one or more additional polymers prepared from ethylene monomers. Such additional polymers include ethylene homopolymers and/or ethylene-olefin copolymers that are well known to those skilled in the art. Generally preferred ethylene-based polymers and copolymers include those sold by ExxonMobil Chemical Company in Houston Tex., including those sold as ExxonMobil HDPE, ExxonMobil LLDPE, and ExxonMobil LDPE, and those sold under the EXACT™, EXCEED™, ESCORENE™, ESCOR™, ENABLE™, NTX™, PAXON™, and OPTEMA™ tradenames.

Exemplary additional polymers include another linear low density polyethylene, another low density polyethylene (LDPE), very low density polyethylene (VLDPE), medium density polyethylene (MDPE), high density polyethylene (HDPE), differentiated polyethylene (DPE), and combinations thereof.

VLDPE compositions are known to those skilled in the art. VLDPE is a subset of LLDPE generally having a density of from about 0.890 or 0.900 g/cm$^3$ to less than about 0.915 g/cm$^3$. VLDPEs can be produced by a number of different processes yielding polymers with different properties. Preferably, VLDPEs are prepared with metallocene catalyst, or more preferably prepared in a gas-phase, slurry, and/or solution process with a metallocene catalyst.

Relatively higher density linear polyethylene, while often considered to be within the scope of low density polyethylene, is also sometimes referred to as "medium density polyethylene" (MDPE). MDPE are known to those skilled in the art. MDPE generally having a density of from about 0.930 to about 0.945 g/cm$^3$. MDPE can be made in any of the above processes with each of the catalyst systems described herein and, additionally, chrome catalyst systems.

Polyethylene having a still greater density is referred to as "high density polyethylene" (HDPE), i.e., polyethylene having a density greater than 0.945 g/cm$^3$. HDPE is typically prepared with either Ziegler-Natta or chromium-based catalysts in slurry reactors, gas phase reactors, or solution reactors. HDPE has been manufactured commercially since the 1950s in slurry systems and is well known in the art.

Differentiated polyethylenes ("DPE") are those polyethylene copolymers or terpolymers produced with a polar comonomer. Typical DPEs are well known in the art and include, but are not limited to, ethylene polymers comprising ethylene n-butyl acrylate, ethylene methyl acrylate acid terpolymers, ethylene acrylic acid, ethylene methyl acrylate, zinc or sodium neutralized ethylene acid copolymers, ethylene vinyl acetate, and combinations of the foregoing.

One or more conventional LLDPEs or high pressure LDPEs may also be blended into the ethylene-based polymer composition. For example, LLDPE blends include blends of metallocene catalyzed LLDPEs and LDPEs or blends of metallocene catalyzed, Ziegler-Natta catalyzed, or vanadium catalyzed LLDPEs. Such LLDPEs may be prepared in gas phase reactors, slurry reactors, and/or solution reactors, e.g., low pressure reactor systems. Conventional LLDPEs have been commercially manufactured since the 1950s in solution reactors, since the 1980s in gas phase reactors. Exemplary LLDPE compositions and blends are described in U.S. Provisional Application Ser. No. 60/798,382, filed May 5, 2006. LDPEs are manufactured in a non-metallic catalyst reaction system, either in a tubular or autoclave reactor and have been commercially available since the 1930s.

Ethylene based polymer compositions optionally include one or more additives that are well known in the art. Additives include, for example: antioxidants (e.g., hindered phenolics such as IRGANOX™ 1076 available from Ciba-Geigy), phosphites (e.g., IRGAFOS™ 168 available from Ciba-Geigy), anti-cling additives, tackifiers, UV stabilizers, heat stabilizers, anti-blocking agents, release agents, slip agents, anti-static agents, pigments, colorants, dyes, waxes, silica, fillers, and talc.

Ethylene-based polymer compositions include at least about 50 weight percent of LLDPE and at least about 0.1 weight percent of LDPE, based on the total weight of the ethylene-based polymer composition. Alternative lower limits of LLDPE are about 75, 80, 85, 90, 92, 95, or 97 weight percent. Alternative upper limits of LLDPE are about 98, 95, 92, 90, and 80 weight percent. Ranges from any lower limit to any upper limit are contemplated. Preferred ethylene-based polymer compositions include more than about 90% LLDPE, and preferably more than about 95% LLDPE. Alternative lower limits of LDPE are about 0.5, 1.0, 2, 5, 8, 10, or 15 weight percent. Alternative upper limits of LDPE are about 50, 25, 20, 15, 10, 8, 5, and 2 weight percent. Ranges from any lower limit to any upper limit are contemplated.

The balance of the weight percentage, if any, is the weight of additional polymers and/or additives. In one or more embodiments, ethylene-based polymer compositions include from about 0.1 to about 40 weight percent of additional polymers. More preferably, ethylene-based polymer compositions include from about 0.1 to about 25, or about 0.1 to about 10, or from about 0.1 to about 5 weight percent of additional polymers.

In one or more embodiments, the ethylene based polymer composition is a blend of the LLDPE and LDPE, where the LLDPE composes approximately 50 wt % to 99 wt %, or more preferably 80 wt %-95 wt % and the LDPE composes approximately 1 wt % to 50 wt % or more preferably 5 wt %-20 wt %.

In one or more preferred embodiments, ethylene-based polymers include a LLDPE produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mol % of the hafnium compound. In at least one embodiment, the LLDPE preferably has a comonomer content of up to about 5 mole %, a melt index $I_{2.16}$ of from about 0.1 to about 30 g/10 min, a melt index ratio of from about 15 to about 40, a weight average molecular weight of from about 15,000 to about 250,000, a molecular weight distribution of from about 2.5 to about 4.5, and a $M_z/M_w$ ratio of from about 1.7 to about 3.5. In another embodiment, LLDPE has a comonomer content of up to about 5 mol %, a melt index $I_{2.16}$ of from about 0.3 to about 5 g/10 min, a melt index ratio of from about 18 to about 35, a weight average molecular weight of from about 50,000 to about 200,000, a molecular weight distribution of from about 3 to about 4, a $M_z/M_w$ ratio of from about 1.8 to about 2.5, and a density of from about 0.900 g/cm³ to about 0.945 g/cm³ or preferably from about 0.910 g/cm³ to about 0.935 g/cm³.

Nothing with regard to these definitions is intended to be contrary to the generic definitions of these resins that are well known in the art. It should be noted, however, that LLDPE may refer to a blend of more than one LLDPE grade/type. Similarly, HDPE may refer to a blend of more than one HDPE grade/type, LDPE may refer to a blend of more than one LDPE grade/type, etc.

Blends with Other Polymers

In one or more embodiments, ethylene-based polymer compositions are blended with one or more other polymers or copolymers. Other polymers that may be blended with ethylene-based polymer compositions include, but are not limited to, propylene-based polymers, propylene ethylene copolymers, polymers derived from dienes, and combinations of the foregoing. For example, ethylene-based polymer compositions may be blended with one or more polymers derived from conjugated and non-conjugated dienes, such as, for example:

(a) straight chain acyclic dienes, such as 1,4-hexadiene and 1,6-octadiene, (b) branched chain acyclic dienes, such as 5-methyl-1,4-hexadiene, 3,7-dimethyl-1,6-octadiene, and 3,7-dimethyl-1,7-octadiene, (c) single ring alicyclic dienes, such as 1,4-cyclohexadiene, 1,5-cyclo-octadiene, tetracyclo-(δ-11,12)-5,8-dodecene, and 1,7-cyclododecadiene, (d) multi-ring alicyclic fused and bridged ring dienes, such as tetrahydroindene, norbornadiene, methyl-tetrahydroindene, dicyclopentadiene (DCPD), bicyclo-(2,2,1)-hepta-2,5-diene, alkenyl, alkylidene, cycloalkenyl and cycloalkylidene norbornenes, such as 5-methylene-2-norbornene (MNB), 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB), and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

Persons of ordinary skill in the art will recognize that a wide variety of polymers, copolymers, and polymer blends may be blended with ethylene-based polymer compositions. Such additional blend components, though not particularly described herein, are within the scope and intended spirit of the invention.

Blend Preparation

Polymer blends are formed using conventional equipment and methods. Such blends may be formed either during resin production, i.e., as a reactor blend or admixture, and/or in film production. For example, blending either ethylene-based polymers or ethylene based polymer compositions and other polymers is accomplished by dry blending individual components, i.e., polymers and/or additives, and subsequently melt mixing in a mixer, or by mixing the components together directly in a mixer or by feeding the individual materials directly into an extruder. Exemplary mixers include, for example, Banbury mixers, a Haake mixers, Brabender internal mixers, or a single or twin-screw extruder.

End-Use Applications

Any of the foregoing ethylene-based polymer compositions may be used in a variety of end-use applications, including:

Generally, ethylene-based polymers are extruded to melt and then formed through a die to make a useful final article, such as a film. A variety of equipment from several manufacturers can be used. Rates of production generally range up to 2000 lbs/hr depending on equipment type, size, and configuration. The die can be an annular shape, such that a film bubble is blown from the polymer, or a flat, slit shape, such that a curtain of polymer falls from it onto a external cooling device, such as a chill roll. Ethylene-based polymers are extruded at standard or non-standard process conditions commonly used by the film manufacturing industry.

film-based products, including stretch/wrap films, shrink films, cling films, sealing films, oriented films, personal care films, medical film products, such as intravenous bags, diaper backsheets, and housewrap;

bags, e.g., shipping sacks, trash bags, liners, industrial liners, membranes, produce bags, heavy duty bags, pouches, and grocery bags;

flexible packaging and food packaging used to bundle, package, and or unitize products, e.g., foodstuffs, fresh cut produce packaging, baked packaging, frozen food packaging, rolls of carpet, liquid containers and various like goods normally containerized and/or palletized for shipping, storage, and/or display;

surface protection applications, with or without stretching, such as in the temporary protection of surfaces during manufacturing, transportation, etc.

Films

Films are formed by methods well known in the art. Generally, ethylene-based polymers are extruded to melt and then formed through a die to make a useful final article, such as a film. A variety of equipment from several manufacturers can be used. Rates of production generally range up to 2000 lbs/hr depending on equipment type, size, and configuration. The die can be an annular shape, such that a film bubble is blown from the polymer, or a flat, slit shape, such that a curtain of polymer falls from it onto a external cooling device, such as a chill roll. Ethylene-based polymers are extruded at standard or non-standard process conditions commonly used by the film manufacturing industry.

Ethylene-based polymer compositions are utilized to prepare monolayer films or multilayer films. These films are formed by any number of well known extrusion or coextrusion techniques discussed below. Films may be unoriented, uniaxially oriented or biaxially oriented. Physical properties of the film may vary depending on the film forming techniques used. Exemplary methods for manufacturing films are described in U.S. Pat. Nos. 6,956,088; 6,936,675; 6,528,597; 6,248,845; 6,242,545; 7,172,816, and 7,179,876; U.S. Provisional Application No. 60/809,509; and U.S. application Ser. No. 11/789,391.

When used in multilayer films, ethylene-based polymer compositions may be used in any layer of the film, or in more than one layer of the film, as desired. When more than one layer of the film is formed of an ethylene-based polymer composition, each such layer can be individually formulated, i.e., the layers formed of the ethylene-based polymer composition can be the same or different chemical composition, density, melt index, thickness, etc., depending upon the desired properties of the film.

To facilitate discussion of different film structures, the following notation is used herein. Each layer of a film is denoted "A" or "B", where "A" indicates a conventional film layer as defined below, and "B" indicates a film layer formed of any of ethylene-based polymer compositions or blend thereof. Where a film includes more than one A layer or more than one B layer, one or more prime symbols (', ", "', etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of an ethylene-based polymer composition or blend thereof disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols, e.g., an A/B film is equivalent to a B/A film, and an A/A'/B'/A" film is equivalent to an A/B/A'/A" film. The relative thickness of each film layer is similarly denoted, with the thickness of each layer relative to a total film thickness of 100 (dimensionless) indicated numerically and separated by slashes, e.g., the relative thickness of an A/B/A'film having A and A' layers of 10 µm each and a B layer of 30 µm is denoted as 20/60/20.

For the various films described herein, the "A" layer can be formed of any material known in the art for use in multilayer films or in film-coated products. Thus, for example, each A layer can be formed of a polyethylene homopolymer or copolymer, and the polyethylene can be, for example, a VLDPE, a LDPE, a LLDPE, a MDPE, a HDPE, or a DPE, as well as other polyethylenes known in the art. The polyethylene can be produced by any suitable process, including metallocene-catalyzed processes and Ziegler-Natta catalyzed processes. Further, each A layer can be a blend of two or more such polyethylenes, and can include additives known in the art. Further, one skilled in the art will understand that the layers of a multilayer film should have an appropriate viscosity match.

In multilayer structures, one or more A layers can also be an adhesion-promoting tie layer, such as PRIMACOR™ ethylene-acrylic acid copolymers available from The Dow Chemical Company, and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

One or more "B" layers are formed of ethylene-based polymer compositions or blends thereof. In one embodiment, the B layer is formed of (a) a LDPE polymer and (b) a LLDPE produced by gas-phase polymerization of ethylene and, optionally, an alpha-olefin with a catalyst having a hafnium transition metal component.

In some embodiments, films exhibit a dart drop impact strength, reported in grams (g) and/or grams per mil (g/mil), measured by ASTM D-1709, method A, of at least 250 g/mil. Preferably films exhibit a dart drop impact strength of at least about 300 g/mil, or at least about 350 g/mil, or at least about 400 g/mil.

In one or more embodiments, films exhibit an MD Elmendorf tear of at least about 75 g/mil as measured by ASTM D-1922. Preferably, films exhibit an MD Elmendorf tear of at least about 100 g/mil or at least about 125 g/mil.

In at least one embodiment, films exhibit a haze of less than about 15% as measured by ASTM D-1003 on a 1 mil film. Preferably, films exhibit a haze of less than about 10%, or less than about 8%, or less than about 6%, or less than about 5%, or about 4.1% as measured by ASTM D-1003 on a 1 mil film.

In some embodiments, films exhibit a 45 degree gloss of at least about 50 as measured by ASTM D-2457. Preferably, films exhibit a 45 degree gloss of at least about 60, or at least about 70, or at least about 75, or at least about 78.

In one or more embodiments, monolayer or multilayer films are composed of ethylene-based polymer compositions composed of from about 80 wt % to about 95 wt % LLDPE and from about 20 wt % to about 5 wt % LDPE. The LLDPE is produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE is preferably characterized by a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. In preferred multilayer embodiments, the polymer of layer A is different from the polymer of layer B.

In at least one preferred embodiment the LLDPE exhibits a melt index of about 0.3 g/10 min to about 5 g/10 min, a melt index ratio of from about 18 to about 35, a molecular weight distribution ($M_w/M_n$) of from about 3 to about 4, a ratio of z-average molecular weight to weight average molecular weight of from about 1.8 to about 2.5, a density of 0.910 g/cm$^3$ to 0.935 g/cm$^3$, and a $2^{nd}$ melt temperature, $T_{m2}$ of from about 115° C. to about 125° C. The LDPE has a melt index of about 0.2 g/10 min to about 10 g/10 min and a density of about 0.915 g/cm$^3$ to about 0.935 g/cm$^3$. When normalized to 1 mil film thickness, films of these embodiments preferably exhibit a dart impact strength of greater than about 300 g, an MD Elmendorf tear of greater than about 100 g, an TD Elmendorf tear of greater than about 500 g. More preferably these films also exhibit a MD tensile strength of from about 6 kpsi to about 10 kpsi and a TD tensile strength of from about 5 kpsi to about 9 kpsi. Finally, the films also exhibit excellent optical properties with haze less than 6% and 45 degree gloss greater than 70 (gloss units).

The thickness of each layer of the film, and of the overall film, is not limited, but is determined according to the desired properties of the film. Typical film layers have a thickness of from about 1 to about 1000 µm, more typically from about 5 to about 100 µm, and typical films have an overall thickness of from about 10 to about 100 µm.

In further applications, microlayer technology may be used to produce films with a large number of thinner layers. For example, microlayer technology may be used to obtain films having, for example, 24, 50, or 100 layers, in which the thickness of an individual layer is less than 1 μm. Individual layer thicknesses for these films may be less than 0.5 μm, less than 0.25 μm, or even less than 0.1 μm.

In other embodiments, using the nomenclature described above, multilayer films have any of the following exemplary structures: (a) two-layer films, such as A/B and B/B', (b) three-layer films, such as A/B/A', A/A'/B, B/A/B' and B/B'/B'', (c) four-layer films, such as A/A'/A''/B, A/A'/B/A'', A/A'/B/B', A/B/A'/B', A/B/B'/A', B/A/A'/B', A/B/B'/B'', B/A/B'/B'' and B/B'/B''/B''', (d) five-layer films, such as A/A'/A''/A'''/B, A/A'/A''/B/A''', A/A'/B/A''/A''', A/A'/A''/B/B', A/A'/B/A''/B', A/A'/B/B'/A'', A/B/A'/B'/A'', A/B/A'/A''/B, B/A/A'/A''/B', A/A'/B/B'/B'', A/B/A'/B''/B'', A/B/A'/B''/A', B/A/A'/B'/B'', B/A/B'/A'/B'', B/A/B'/B''/A', A/B/B'/B''/B''', B/A/B'/B''/B''', B/A/B'/A''/B''', B/B'/A/B''/B''', and B/B'/B''/B'''/B'''', and similar structures for films having six, seven, eight, nine, twenty-four, forty-eight, sixty-four, one hundred, or any other number of layers. It should be appreciated that films having still more layers can be formed using ethylene-based polymer compositions or blends thereof, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films composed of the ethylene-based polymer compositions can also be used as coatings, e.g., films formed of the ethylene-based polymer compositions, or multilayer films including one or more layers formed of the ethylene-based polymer compositions, can be coated onto a substrate such as paper, metal, glass, plastic and other materials capable of accepting a coating. Such coated structures are also within the scope of the present invention.

The total thickness of multilayer films may vary based upon the application desired. Those skilled in the art will appreciate that the thickness of individual layers for multilayer films may be adjusted based on desired end-use performance, resin or copolymer employed, equipment capability, and other factors and thus may be more than or less than the film thickness ranges stated above. The materials forming each layer may be coextruded through a coextrusion feedblock and die assembly to yield a film with two or more layers adhered together but differing in composition. Alternatively, multilayer films are manufactured by laminating two or more separate films together into one structure. Exemplary films include blown films formed by coextrusion or by lamination.

Films are generally prepared with one or more extruders. Multiple extruders all running the same polymer can manufacture a coextruded film that is similar in performance to a monolayer film of the same polymer. This configuration may result from a restrictive equipment arrangement or to obtain a high output rate.

Extrusion temperature generally is determined by the ethylene-based composition being extruded. The extrusion temperature may be held at a flat temperature profile, or may vary. For example, the extrusion temperature may increase to a maximum and then decrease, i.e., a "hump profile." Heating profiles are achieved by setting extruder zones at different temperatures. For example, zone one is set to a relatively cool temperature, zone two is set to a relatively high temperate, and then zones three and four, and five if present, are set relatively lower than zone two but still much higher than zone one.

In one or more embodiments, the extrusion temperature on a blown film line is from about 180° C. to about 220° C., or from about 185° C. to about 215° C. Preferably, the extrusion temperature is held constant at about 190° C. In one or more embodiments, the extrusion temperature on a cast film line is from about 250° C. to about 300° C., or from about 270° C. to about 290° C.

Extrusion blow up ratio, i.e., BUR, is from about 1.8 to about 3.2, or from about 2.2 to about 2.8. Preferably, the extrusion blow up ratio is 2.5.

Films can further be embossed, or produced or processed according to other known film processes. The films can be tailored to specific applications by adjusting the thickness, materials and order of the various layers, as well as the additives in or modifiers applied to each layer.

In other embodiments, also provided are:

Embodiment 1

A film comprising:
an ethylene-based polymer composition comprising:
a. LLDPE prepared with a metallocene catalyst having:
i. a melt index ($I_2$) of from about 0.1 g/10 min to about 30 g/10 min,
ii. a melt index ratio ($I_{21.6}/I_{2.16}$) of from about 15 to about 40,
iii. a weight average molecular weight ($M_w$) of from about 15,000 to about 250,000,
iv. a molecular weight distribution ($M_w/M_n$) of from about 2.5 to about 4.5, and
v. a $M_z/M_w$ ratio of from about 1.5 to about 3.5, and
b. a high pressure LDPE having:
i. a melt index ($I_2$) of from about 0.2 g/10 min to about 10 g/10 min, and
ii. a density of from about 0.915 g/cm$^3$ to about 0.935 g/cm$^3$,
wherein the film has a Dart Drop Impact ($F_{50}$) of at least about 300 g/mil as measured by ASTM D-1709, Procedure A, and a haze of less than about 10% as measured by ASTM D-1003 on a 1 mil film.

Embodiment 2

The film of embodiments 1 or 2, wherein the film comprises:
at least about 80 wt. % LLDPE, and
from about 5 wt. % to about 20 wt. % LDPE.

Embodiment 3

The film of any one of the preceding embodiments, wherein the film has a Dart Drop Impact ($F_{50}$) of at least about 400 g/mil as measured by ASTM D-1709, Procedure A.

Embodiment 4

The film of any one of the preceding embodiments, wherein the film has a dart drop reduction of less than 60% of the dart drop of the same film prepared without the LDPE.

Embodiment 5

The film of any one of the preceding embodiments, wherein the film has an MD Elmendorf tear of at least about 100 g/mil as measured by ASTM D-1922.

Embodiment 6

The film of any one of the preceding embodiments, wherein the film has a haze of less than about 6% as measured by ASTM D-1003 on a 1 mil film.

Embodiment 7

The film of any one of the preceding embodiments, wherein the film has a 45 degree gloss of at least about 70 as measured by ASTM D-2457.

Embodiment 8

The film of any one of the preceding embodiments, wherein the LLDPE is prepared with a metallocene catalyst that includes hafnium.

Embodiment 9

The film of any one of the preceding embodiments, wherein the ethylene-based polymer composition is produced by gas-phase polymerization of ethylene with a catalyst having as a transition metal component a bis(n-$C_{3-4}$ alkyl cyclopentadienyl) hafnium compound, and said transition metal component comprises from about 95 mol % to about 99 mol % of said hafnium compound.

Embodiment 10

The film of any one of the preceding embodiments, wherein the LLDPE has:
i. a melt index ($I_2$) of from about 0.3 g/10 min to about 5 g/10 min,
ii. a melt index ratio ($I_{21.6}/I_{2.16}$) of from about 18 to about 35,
iii. a weight average molecular weight ($M_w$) of from about 50,000 to about 200,000,
iv. a molecular weight distribution ($M_w/M_n$) of from about 3 to about 4, and
v. a $M_z/M_w$ ratio of from about 1.8 to about 2.5.

Embodiment 11

The film of any one of the preceding embodiments, wherein the LDPE is manufactured by a high-pressure process and has:
a. a melt index ($I_2$) of from about 0.2 g/10 min to about 10 g/10 min, and
b. a density of from about 0.915 g/cm³ to about 0.935 g/cm³.

Embodiment 12

The film of any one of the preceding embodiments, wherein the LDPE is a homopolymer.

Embodiment 13

The film of any one of the preceding embodiments, wherein the LLDPE comprises about 5 mol % or less of units derived from an alpha-olefin comonomer.

Embodiment 14

The film of embodiment 13, wherein the alpha-olefin comonomer is derived from 1-hexene.

Embodiment 15

The film of any one of the preceding embodiments, wherein the LDPE is an ethyl-vinyl acetate copolymer, with a vinyl acetate content less than about 10 wt %.

Embodiment 16

The film of any one of the preceding embodiments, wherein the film is a monolayer film.

Embodiment 17

The film of any one of the preceding embodiments, wherein the film is a multilayered film having at least one layer comprising the ethylene-based polymer composition.

Embodiment 18

The film of any one of the preceding embodiments, wherein the ethylene-based polymer composition further comprises:
from about 1 to about 20 wt %, based on the weight of the ethylene-based polymer composition, of an additional polymer selected from the group consisting of a high density polyethylene, an additional linear low density polyethylene, an additional low density polyethylene, a medium density polyethylene, a very low density polyethylene, a differentiated polyethylene, and combinations thereof.

Embodiment 19

The film of any one of the preceding embodiments, wherein the film comprises at least one non-polyethylene based polymer.

Embodiment 20

A method of preparing a film comprising the steps of:
a. providing an LLDPE prepared with a metallocene catalyst having:
i. a melt index ($I_2$) of from about 0.1 g/10 min to about 30 g/10 min,
ii. a melt index ratio ($I_{21.6}/I_{2.16}$) of from about 15 to about 40,
iii. a weight average molecular weight ($M_w$) of from about 15,000 to about 250,000,
iv. a molecular weight distribution ($M_w/M_n$) of from about 2.5 to about 4.5, and
v. a $M_z/M_w$ ratio of from about 1.5 to about 3.5,
b. providing an high pressure LDPE having:
i. a melt index ($I_2$) of from about 0.2 g/10 min to about 10 g/10 min, and
ii. a density of from about 0.915 g/cm³ to about 0.935 g/cm³,
c. combining the LLDPE and the LDPE to form an ethylene-based polymer composition; and
d. extruding the ethylene-based polymer composition to form a film having a Dart Drop Impact ($F_{50}$) of at least about 300 g/mil as measured by ASTM D-1709, Procedure A, and a haze of less than about 10% as measured by ASTM D-1003 on a 1 mil film.

Embodiment 21

The method of preparing a film of embodiment 20, further comprising the step of separately combining the LLDPE, the LDPE, the ethylene-base polymer composition, or combinations thereof with at least one additional polymer or at least one additive.

Embodiment 22

The method of preparing a film of embodiments 20 or 21, further comprising the step of extruding the ethylene-based polymer composition.

Embodiment 23

The method of preparing a film of any one of embodiments 20-22, wherein the LLDPE is produced by gas-phase polymerization of ethylene with a catalyst having as a transition metal component a bis(n-$C_{3-4}$ alkyl cyclopentadienyl) hafnium compound, and said transition metal component comprises from about 95 mol % to about 99 mol % of said hafnium compound.

Embodiment 24

The method of preparing a film of any one of embodiments 20-23, wherein the film has a haze of less than about 6% as measured by ASTM D-1003 on a 1 mil film.

Example

The properties cited below were determined in accordance with the following test procedures. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a micrometer, such as those available from the Heidenhaim Corporation as models ND221, ND221B, MT12 and MT1201. For each film sample, twenty film thickness datapoints were measured across the web as the film was passed through the gauge in a transverse direction. From these measurements, an average gauge measurement was determined and reported.

Tensile Strength at Yield, reported in pounds per square inch ($lb/in^2$ or psi), was measured as specified by ASTM D-882.

Ultimate Tensile Strength, reported in pounds per square inch ($lb/in^2$ or psi), was measured as specified by ASTM D-882.

Elongation at Break, reported as a percentage (%), was measured as specified by ASTM D-882.

Secant Modulus, measured at 1% and reported in pounds per square inch ($lb/in^2$ or psi), was measured as specified by ASTM D-882.

Puncture testing was performed by using an Instron or Universal Testing Machine to measure the force and energy with which a slow moving (10"/min) puncture probe of ¾" diameter penetrates a film.

Elmendorf Tear, reported in grams (g) and/or grams per mil (g/mil), was measured as specified by ASTM D-1922.

Dart $F_{50}$, or Dart Drop Impact or Dart Drop Impact Strength, reported in grams (g) and/or grams per mil (g/mil), was measured as specified by ASTM D-1709, method A.

45 degree Gloss, reported as dimensionless gloss units, was measured as specified by ASTM D-2457.

Haze, reported as a percentage (%), was measured as specified by ASTM D-3354.

Reblock testing was performed by placing two layers of separated film in an oven for a set amount of time, at a set temperature, and under a constant pressure. The two films are then removed from the oven, separated, and the blocking measured in accordance with ASTM D-3354.

Example

A LLDPE polymer composition was compared to a conventional polymer composition. The LLDPE, hereinafter LLDPE Sample, was prepared using a bis(n-$C_{3-4}$ alkyl cyclopentadienyl) hafnium metallocene catalyst in a Unipol gas phase reactor provided by Univation Technologies in Seadrift, Tex. An exemplary gas phase reactor is described in the examples set forth in U.S. Pat. No. 6,956,088 B2, which is fully incorporated herein by reference.

The conventional polymer composition, hereinafter Conventional Sample, was a zirconium-based metallocene resin, commercially available as Exceed 1018CA from ExxonMobil Chemical Company of Houston, Tex. Its melt index, density, and additives are generally similar to the inventive hafnium based material used herein.

Table 1 shows density and melt index measurements for the LLDPE Sample. A hindered phenolic stabilizer, BHT, was added to the sample for melt and flow index analysis.

TABLE 1

| | |
|---|---|
| Melt Index ($I_{2.16}$), dg/min | 0.96 |
| Flow Index ($I_{21.6}$), dg/min | 21.7 |
| MIR ($I_{21.6}/I_{2.16}$) | 22.5 |
| Density (ASTM plaque), g/cm$^3$ | 0.9178 |

The LLDPE Sample was compounded with antioxidants and process aids on a 57 mm Werner & Pfleiderer twin screw extruder i.e., ZSK-57 extruder, to yield the following concentrations shown in Table 2.

TABLE 2

| Additive | Ppm |
|---|---|
| Primary Antioxidant: Irganox 1076 | 500 |
| Secondary Antioxidant: Weston 399B | 2000 |
| Dynamar 5920A | 800 |

Table 3 compares physical properties of the LLDPE Sample and the Conventional Sample.

TABLE 3

| Material | Test | Conventional Sample | LLDPE Sample |
|---|---|---|---|
| Melt Index, dg/min ($I_2$) | D1238 | 0.98 | 0.84 |
| Flow Index, dg/min ($I_{21}$) | | 17.0 | 20.3 |
| Melt Flow Ratio ($I_{21}/I_2$) | | 17.4 | 24.2 |
| Swell | | 1.08 | 1.07 |
| ASTM Plaque Density, g/cc | D1505 | 0.9200 | 0.9188 |
| DSC, deg C. | | | |
| 1st Melt | | 119.8 | 121.4 |
| | | 117.2 | |
| | | 77.3 | 57.5 |
| Crystallization | | 105.7 | 107.5 |
| | | 99.0 | 92.5 |
| | | 68.6 | 64.7 |
| 2$^{nd}$ Melt | | 118.9 | 120.8 |
| | | 109.3 | 105.9 |
| Vicat Softening Pt, deg C. | D1525 | 110 | 106 |

Films

Four monolayer films were prepared from blended and unblended polymer compositions and tested for physical properties. The First Film was composed of the Conventional Sample. The Second Film was composed of the LLDPE Sample. The Third Film was composed of 90 weight percent of the Conventional Sample and 10 weight percent of an LDPE. The Fourth Film was compose of an ethylene-based polymer composition composed of a blend of 90 weight percent of the LLDPE Sample and 10 weight percent the same LDPE as was used in the Third Film. Each film was produced on a Sano 3.5" blown film extruder.

The LDPE was a homopolymer, tubular resin having a nominal melt index of 2.0 g/10 min and a density of 0.921 g/cm$^3$. The LDPE is commercially available as LD136.MH from ExxonMobil Chemical Company.

Figure 2:
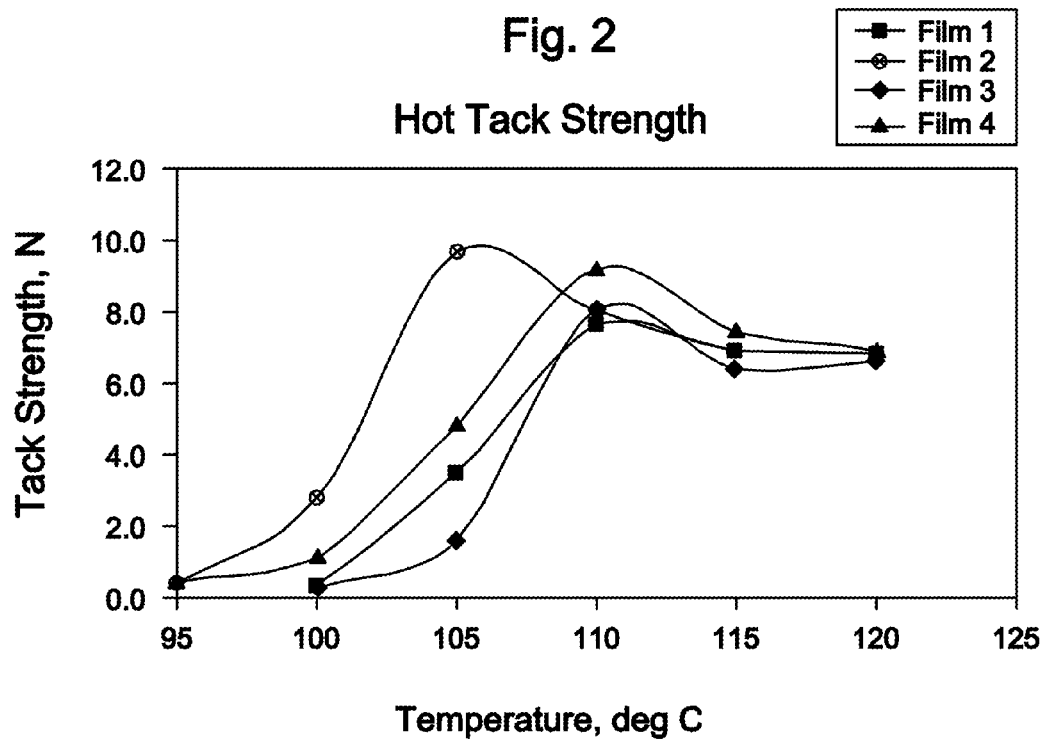
FIG. 2 is a graph of hot tack curves comparing blown films produced from the present ethylene-based polymer compositions and a conventional zirconium based metallocene polymer.
Figure 3C:
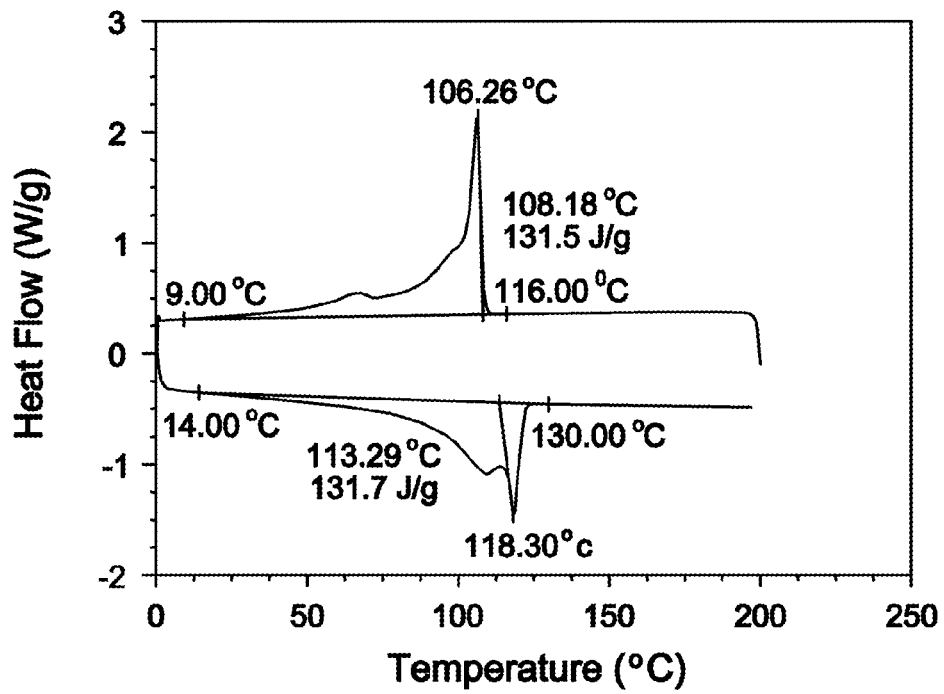
Figure 3D:
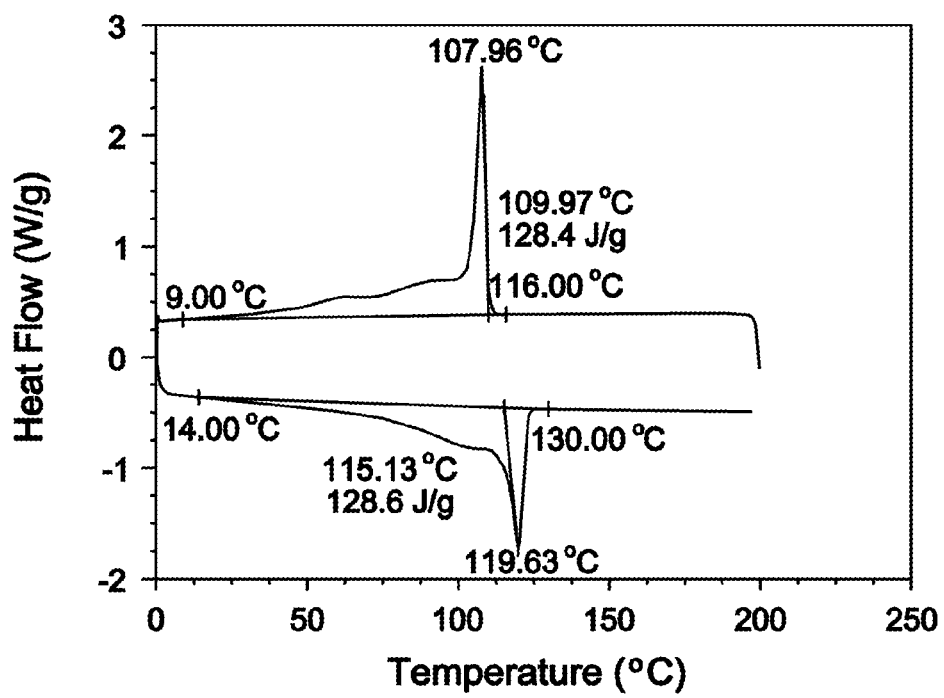

As shown in Table 4, nominal film manufacturing conditions were 10 lbs/hr/in die circumference, 10" die, 90 mil die gap, and 2.5:1 BUR. Film properties are provided in Tables 5. Tables 6 & 7 and FIGS. 1 and 2 provide heat seal and hot tack data.

TABLE 4

|  | Material | | | |
|---|---|---|---|---|
|  | 1st Film | 2nd Film | 3rd Film | 4th Film |
| Extruder Speed, rpm | 46.5 | 44.5 | 46.5 | 45.5 |
| Rate, lb/hr | 317 | 315 | 316 | 315 |

TABLE 4-continued

|  | Material | | | |
|---|---|---|---|---|
|  | 1st Film | 2nd Film | 3rd Film | 4th Film |
| % Torque | 35.0 | 33.9 | 33.3 | 31.4 |
| Head Pres, psi | 4040 | 4310 | 4170 | 4210 |
| Melt Temp, deg F. | 416 | 413 | 414 | 412 |
| Horsepower | 23 | 21 | 22 | 20 |
| Line Speed, fpm | 159.2 | 163.2 | 163.3 | 163.5 |
| Air Temp, deg F. | 51 | 50 | 50 | 51 |
| Frost Line Height, in | 27 | 27 | 26 | 26 |

TABLE 5

|  |  | Material | | | |
|---|---|---|---|---|---|
|  |  | 1st Film | 2nd Film | 3rd Film | 4th Film |
| Gauge, mils |  |  |  |  |  |
| Avg |  | 1.04 | 1.02 | 1.03 | 1.05 |
| Min |  | 0.97 | 0.93 | 0.97 | 0.93 |
| Max |  | 1.14 | 1.09 | 1.10 | 1.13 |
| Tensile @ Yield, psi | D882 |  |  |  |  |
| MD |  | 1,255 | 1,246 | 1,445 | 1,377 |
| TD |  | 1,304 | 1,322 | 1,484 | 1,534 |
| Ultimate Tensile, psi | D882 |  |  |  |  |
| MD |  | 10,538 | 9,518 | 8,159 | 8,310 |
| TD |  | 9,642 | 8,699 | 7,721 | 7,278 |
| Break Elongation, % | D882 |  |  |  |  |
| MD |  | 582 | 489 | 525 | 477 |
| TD |  | 666 | 645 | 647 | 633 |
| 1% Secant Modulus, psi | D882 |  |  |  |  |
| MD |  | 24,731 | 24,920 | 28,572 | 28,936 |
| TD |  | 26,439 | 27,195 | 33,556 | 35,195 |
| Puncture |  |  |  |  |  |
| Peak Force, lbs |  | 12.6 | 11.1 | 11.9 | 10.8 |
| Peak Force, lbs/mil |  | 12.2 | 10.9 | 11.5 | 10.3 |
| Break Energy, in · lbs |  | 44.1 | 33.7 | 28.7 | 25.0 |
| Break Energy, in · lbs/mil |  | 42.4 | 33.0 | 27.8 | 23.8 |
| Elmendorf Tear | D1922 |  |  |  |  |
| MD, g |  | 258 | 227 | 122 | 123 |
| MD, g/mil |  | 246 | 223 | 118 | 119 |
| TD, g |  | 374 | 420 | 647 | 588 |
| TD, g/mil |  | 358 | 408 | 628 | 563 |
| Dart Drop, g | D1709A | 750 | 957 | 192 | 464 |
| g/mil |  | 721 | 938 | 186 | 441 |
| 45 deg Gloss | D2457 |  |  |  |  |
| MD |  | 32 | 42 | 82 | 76 |
| TD |  | 31 | 41 | 83 | 77 |
| Haze, % | D1003 | 27.1 | 13.9 | 3.0 | 4.1 |
| Reblock, g | D3354 |  |  |  |  |
| (in/in) 24 hr, 60° C. |  | 43 | 80 | 193 | 206 |

TABLE 6

|  |  | Material | | | | | | | |
|---|---|---|---|---|---|---|---|---|---|
|  |  | 1st Film | | 2nd Film | | 3rd Film | | 4th Film | |
|  | Heat Seal Strength, lb | value | mode | value | mode | value | mode | value | Mode |
| Temperature, ° C. | 100 | 0.05 | p | 0.15 | p | 0.05 | p | 0.11 | P |
|  | 105 | 0.13 | p | 0.78 | p | 0.11 | p | 0.28 | P |
|  | 110 | 1.91 | p | 1.81 | p | 1.01 | p | 2.18 | P |
|  | 115 | 2.10 | b/p | 1.89 | b/p | 2.59 | p | 2.40 | P |
|  | 120 | 2.20 | b | 1.94 | b/p | 2.84 | b | 2.75 | b/p |
|  | 125 | 2.37 | b | 1.99 | b | 2.93 | b | 2.78 | B |
|  | 130 | 2.22 | b | 2.11 | b | 2.98 | b | 2.86 | B |
|  | 135 |  |  | 2.12 | b |  |  | 2.88 | B |

TABLE 7

| Hot Tack Strength, N | | 1st Film | 2nd Film | 3rd Film | 4th Film |
|---|---|---|---|---|---|
| Temperature, °C. | 95 | | 0.34 | | 0.43 |
| | 100 | 0.30 | 2.80 | 0.23 | 1.14 |
| | 105 | 3.42 | 9.64 | 1.58 | 4.86 |
| | 110 | 7.63 | 7.99 | 8.09 | 9.21 |
| | 115 | 6.89 | 6.91 | 6.40 | 7.51 |
| | 120 | 6.83 | | 6.62 | 6.93 |

Referring to Tables 5, Films 3 and 4 exhibited improved optical properties compared to Films 1 and 2. However, conventional blended films like Film 3 generally exhibit a decrease in physical strength attributes (e.g., impact strength, tensile strength, MD Elmendorf tear). Such film weakening poses a problem to those who are trying to manufacture high strength films.

Unlike conventional blended films, Film 4 unexpectedly maintained favorable physical attributes while reducing unfavorable strength attributes. The reduction in physical strength attributes of Film 4 was less than Film 3. Therefore, Film 4 exhibited strength properties more similar to the unblended films, i.e., Films 1 and 2. For example, the decrease in dart drop was approximately 50% for Film 4 versus 75% for Film 3. Moreover, Film 4 retained more tensile strength, Elmendorf tear, and puncture resistance compared to Film 3.

For reference, a film having similar properties was produced from a Zieglar-Natta catalyzed hexene resin known for its high impact strength. The resin, NTX-141, is commercially available from ExxonMobil Chemical Co. Similar to the sample above, its dart drop strength also dropped about 75% with blending of LDPE.

Referring to FIGS. 1 and 2, addition of LDPE to the unblended samples improved the ultimate seal strength but slightly reduced hot tack strength. For example, Film 4 exhibited a lower temperature requirement for sealing and tacking compared to Film 3.

Without being limited by theory, it is believed that films prepared from the present ethylene-based polymer compositions exhibit improved physical properties compared to the conventional films because of a greater crystallinity change in the present films. Referring to FIGS. 3(a) to 3(d), DSC analysis shows that addition of a LDPE to the Conventional Sample lowered the composition enthalpy by 8.0 J/g. However, the addition of the same LDPE to the present mLLDPE lowered the composition enthalpy by only 3.4 J/g. It is believed that the crystallinity phenomenon results in improved properties.

Although the present invention has been described in considerable detail with reference to certain aspects and embodiments thereof, other aspects and embodiments are possible. Therefore, the spirit and scope of the appended claims should not be limited to the description of the embodiments contained herein.

What is claimed is:

1. A film comprising:
   an ethylene-based polymer composition comprising:
   a. greater than 90 wt % linear low density polyethylene (LLDPE) prepared with a metallocene catalyst having:
      i. a melt index ($I_2$) of from 0.5 g/10 min to 0.84 g/10 min,
      ii. a melt index ratio ($I_{21.6}/I_{2.16}$) of from 20 to 25,
      iii. a weight average molecular weight ($M_w$) of from 90,000 to 250,000,
      iv. a molecular weight distribution ($M_w/M_n$) of from 3.0 to 4.0,
      v. a $M_z/M_w$ ratio of from 2.0 to 2.4, and
      vi. a CDBI of less than 40%, and
   b. from 0.1 to less than 10 wt % of a high pressure low density polyethylene (LDPE) having:
      i. a melt index ($I_2$) of from 1 to 3 g/10 min, and
      ii. a density of from 0.919 to 0.925 g/cm$^3$,
   wherein the film has a Dart Drop Impact ($F_{50}$) of from 300 to 441 g/mil as measured by ASTM D-1709, Procedure A, and a haze of less than 10% as measured by ASTM D-1003 on a 1 mil film, and the wt % s are based upon total weight of the ethylene-based polymer composition.

2. The film of claim 1, wherein the film comprises:
   at least about 95 wt. % LLDPE, and
   from about 5 wt. % to less than 10 wt. % LDPE.

3. The film of claim 1, wherein the film has a Dart Drop Impact ($F_{50}$) of from 400 to 441 g/mil as measured by ASTM D-1709, Procedure A.

4. The film of claim 1, wherein the film has a dart drop reduction of less than 60% of the dart drop of the same film prepared without the LDPE.

5. The film of claim 1, wherein the film has an MD Elmendorf tear of at least about 100 g/mil as measured by ASTM D-1922.

6. The film of claim 1, wherein the film has a haze of less than about 6% as measured by ASTM D-1003 on a 1 mil film.

7. The film of claim 1, wherein the film has a 45 degree gloss of at least about 70 as measured by ASTM D-2457.

8. The film of claim 1, wherein the LLDPE is prepared with a metallocene catalyst that includes hafnium.

9. The film of claim 1, wherein the ethylene-based polymer composition is produced by gas-phase polymerization of ethylene with a catalyst having as a transition metal component a bis(n-C$_{3-4}$ alkyl cyclopentadienyl) hafnium compound, and said transition metal component comprises from about 95 mol % to about 99 mol % of said hafnium compound.

10. The film of claim 1, wherein the LDPE is a homopolymer.

11. The film of claim 1, wherein the LLDPE comprises about 5 mol % or less of units derived from an alpha-olefin comonomer.

12. The film of claim 11, wherein the alpha-olefin comonomer is derived from 1-hexene.

13. The film of claim 1, wherein the LDPE is an ethylene-vinyl acetate copolymer, with a vinyl acetate content less than about 10 wt %.

14. The film of claim 1, wherein the film is a monolayer film.

15. The film of claim 1, wherein the film is a multilayered film having at least one layer comprising the ethylene-based polymer composition.

16. The film of claim 1, wherein the ethylene-based polymer composition further comprises
   an additional polymer selected from the group consisting of a high density polyethylene, an additional linear low density polyethylene, an additional low density polyethylene, a medium density polyethylene, a very low density polyethylene, a differentiated polyethylene, and combinations thereof.

17. The film of claim 1, wherein the film comprises at least one non-polyethylene based polymer.

18. The film of claim 1, wherein the LLDPE has a density of from about 0.915 g/cm$^3$ to about 0.925 g/cm$^3$.

19. A method of preparing a film comprising the steps of:
   a. providing greater than 90 wt % of an linear low density polyethylene (LDDPE) prepared with a metallocene catalyst having:
      i. a melt index ($I_2$) of from 0.5 g/10 min to 0.84 g/10 min,
      ii. a melt index ratio ($I_{21.6}/I_{2.16}$) of from 20 to 25, iii. a weight average molecular weight ($M_w$) of from 90,000 to 250,000,
iv. a molecular weight distribution ($M_w/M_n$) of 3.0 to 4.0,
v. a $M_z/M_w$ ratio of from 2.0 to 2.4, and
vi. a CDBI of less than 40%,
b. providing from 0.1 to less than 10 wt % of an high pressure low density polyethylene (LDPE) having:
  i. a melt index ($I_2$) of from 1 to 3 g/10 min, and
  ii. a density of from 0.919 to 0.925 g/cm$^3$,
c. combining the LLDPE ad the LDPE to form an ethylene-based polymer composition; and
d. extruding the ethylene-based polymer composition to form a film having a Dart Drop Impact ($F_{50}$) of from 300 to 441 g/mil as measured by ASTM D-1709, Procedure A, and a haze of less than 10% as measured by ASTM D-1003 on a 1 mil film,
wherein the wt % s are based upon total weight of the ethylene-based polymer composition.

20. The method of preparing a film of claim 19, further comprising the step of separately combining the LLDPE, the LDPE, the ethylene-base polymer composition, or combinations thereof with at least one additional polymer or at least one additive.

21. The method of preparing a film of claim 19, wherein the LLDPE is produced by gas-phase polymerization of ethylene with a catalyst having as a transition metal component a bis(n-$C_{3-4}$ alkyl cyclopentadienyl) hafnium compound, and said transition metal component comprises from about 95 mol % to about 99 mol % of said hafnium compound.

22. The method of preparing a film of claim 19, wherein the film has a haze of less than about 6% as measured by ASTM D-1003 on a 1 mil film.

23. The method of preparing the film of claim 19, wherein the LLDPE has a density of from about 0.915 g/cm$^3$ to about 0.925 g/cm$^3$.

* * * * *